United States Patent [19]
Shellhause

[11] 3,983,703
[45] Oct. 5, 1976

[54] MASTER CYLINDER PUSH ROD RETENTION

[75] Inventor: Ronald L. Shellhause, Vandalia, Ohio

[73] Assignee: General Motors Corporation, Detroit, Mich.

[22] Filed: Oct. 3, 1975

[21] Appl. No.: 619,200

[52] U.S. Cl. .............................. 60/562; 92/165 R; 267/160
[51] Int. Cl.² ........................................ B60T 11/20
[58] Field of Search ................ 60/562, 555; 92/165; 267/160

[56] References Cited
UNITED STATES PATENTS

| | | | |
|---|---|---|---|
| 2,703,557 | 3/1955 | Polki | 92/165 R |
| 2,914,713 | 11/1959 | Rice | 267/160 X |
| 3,109,287 | 11/1963 | Gardner | 60/562 X |
| 3,147,596 | 9/1964 | Wallace | 60/562 |
| 3,922,858 | 12/1975 | Sadler | 60/562 |
| 3,928,970 | 12/1975 | Farr | 60/562 |

FOREIGN PATENTS OR APPLICATIONS 2,120,781 11/1971 Germany ........................ 267/160

Primary Examiner—William R. Cline
Assistant Examiner—H. Burks
Attorney, Agent, or Firm—D. D. McGraw

[57] ABSTRACT

A master cylinder in which the piston and push rod, connected with an open ball and socket arrangement, are retained in the master cylinder bore and held in the requisite inactive piston stop position by a retainer. The retainer is a generally U-shaped wire clip which extends through a pair of parallel through-bores in a plane perpendicular to the master cylinder bore axis. The through-bores are spaced apart sufficiently far to permit the retainer to receive the smaller rod portion of the push rod between the retainer legs. They also intersect the master cylinder bore chordally so that they are engaged by the push rod ball end when the master cylinder is released. An internal groove in the master cylinder bore adjacent the bore open end has chamfered side walls which prevent damage to the master cylinder seal lips when the master cylinder piston is assembled in the bore. The parallel through-bores intersect the internal groove, thus protecting the master cylinder seal lips from the sharp edges of the ends of the through-bores. A notch is provided on the outer periphery of the master cylinder body into which the through-bores open. The center portion of the U-shaped retainer fits within the notch. The outer ends of the retainer legs are out-turned slightly and the legs are resiliently urged apart so that the retainer is releasably held against removal.

2 Claims, 2 Drawing Figures

Fig.1

U.S. Patent  Oct. 5, 1976  3,983,703
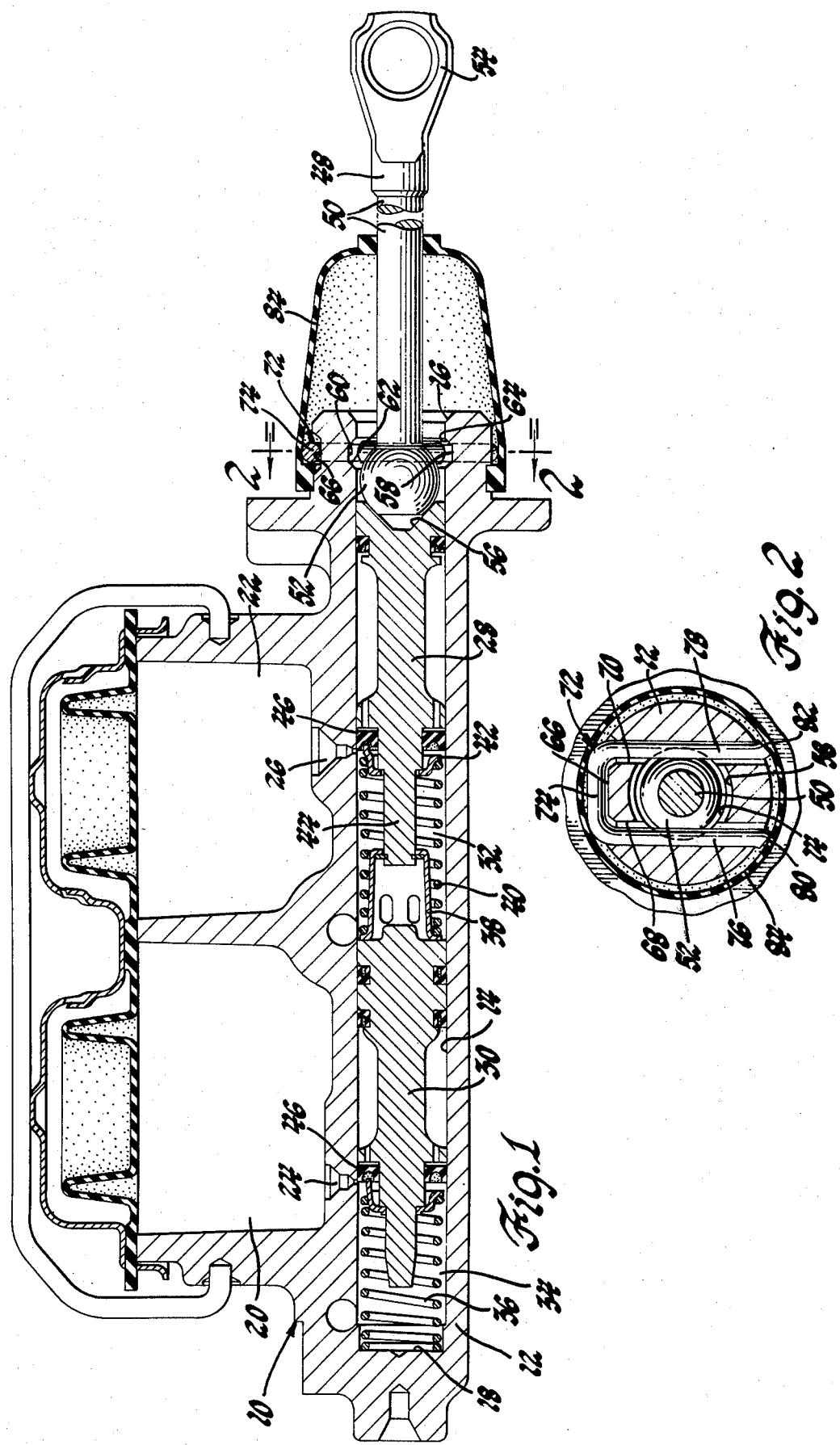

MASTER CYLINDER PUSH ROD RETENTION

The invention relates to an arrangement for retaining the push rod and piston or pistons in a master cylinder bore. In practicing the invention a generally U-shaped resilient retainer is inserted in generally parallel through-bores located in a plane perpendicular to the master cylinder bore and intersecting that bore through an internal chamfered-wall groove. The center portion of the retainer joining the retainer legs fits in a notch formed on an external portion of the master cylinder body into which the through-bores open. The spring-like action of the retainer helps hold it in place, and the legs may have out-turned ends to further assist in retention. The rod portion of the master cylinder push rod extends between the retainer legs and terminates in a headed member which engages the retainer legs in the areas where they extend through the master cylinder bore. The rear end of the piston associated with the headed push rod has a recess or socket into which the head fits. The piston return spring system within the master cylinder continually urges the master cylinder piston against the push rod head and in turn urges the push rod head toward engagement with the retainer and stop member. A boot may be fitted over the retainer and the push rod to prevent the entry of dust and other foreign matter into the master cylinder bore.

In the drawing:

FIG. 1 is a cross section view of a master cylinder embodying the invention.

FIG. 2 is a section view with parts broken away and taken in the direction of arrows 2—2 of FIG. 1.

The master cylinder 10 may be of any suitable type, and is illustrated as being of the tandem pressure chamber type in common usage. It includes a body 12 formed with a bore 14 open at the rear end 16 and closed at the front end 18. Reservoir chambers 20 and 22 for brake fluid are provided and are connected to the bore 14 through suitable compensation ports 24 and 26. A primary piston 28 and a secondary piston 30 are received in tandem in bore 14 and cooperate therewith to define primary pressurizing chamber 32 and secondary pressurizing chamber 34. A piston return spring 36 in chamber 34 urges the secondary piston 30 rearwardly against spring retainer 38 and spring 40. Spring 40 seats against a spring seat 42 in the primary pressurizing chamber so that it continually urges pistons 28 and 30 apart, subject to the lost motion connection formed by spring retainer 38 and the primary piston extension 44. The primary and secondary pistons are provided with suitable lip seals 46 as is commonly practiced in the art. In the retracted position illustrated, the seals 46 are positioned so that compensation ports 24 and 26 are in fluid communication with the pressurizing chambers 32 and 34.

A push rod 48 extends into the rear end 16 of bore 14. It has a rod section 50 with a head 52 formed on the forward end thereof. The rear end 54 of the push rod is suitably connected to be actuated by the operator. The rear end of primary piston 28 has a recess or socket 56 receiving the push rod head 52 in a ball and socket relation, the socket being of the open type. This permits compressive force transmission between the piston and the push rod while allowing some pivotal movement of the push rod.

The bore 14 has an inner peripheral annular groove 58 formed therein adjacent the bore open end 16. Groove 58 has a bottom wall 60 and chamfered side walls 62 and 64. The chambers on the side walls are provided to prevent damage to the lip seals 46 when the pistons 28 and 30 are assembled in the bore. A notch 66 is provided on the outer surface of the body 12 and preferably in a plane also containing the annular groove 58. Notch 66, better seen in FIG. 2, covers an arcuate portion of the outer periphery of the master cylinder body and defines a chord as seen in cross section. A pair of substantially parallel through-bores 68 and 70 extend from the notch 66 so that they intersect the bore 14 through the bottom wall 60 of groove 58. The length of the chordal portion of notch 66 is sufficiently long to permit the through-bores 68 and 70 to fully open into the notch.

A retainer and stop member 72 is provided and is substantially U-shaped. The center portion 74 of the retainer is positioned within notch 66. The legs 76 and 78 of the retainer respectively extend through the through-bores 68 and 70. In the preferred embodiment the retainer is a spring wire, with the legs 76 and 78 resiliently urged slightly apart so that when they extend through the through-bores 68 and 70 they provide a holding action. Their ends are also preferably out turned at 80 and 82 so that they cooperate with the ends of the through-bores in further acting to releasably lock the retainer against removal. The boot 84 fits over the retainer 72 and the push rod section 50 to seal the rear end of the master cylinder against the entry of foreign material.

The retainer legs 76 and 78 extend chordally through master cylinder bore 14 and on either side of the piston rod section 50 so that the rod may freely pass through the retainer and move freely in its normal pivoting action during master cylinder operation. The rod head 52 is larger than the space between the legs 76 and 78 so that it is engageable with these retainer legs to prevent undesired removal of the rod and the master cylinder pistons. When the master cylinder is in the inactive position illustrated, head 52 engages legs 76 and 78. Piston 28 is in engagement with piston rod head 52 under the force of springs 36 and 40. This provides an accurate stop which properly positions lip seals 46 relative to compensation ports 24 and 26. The push rod and pistons are therefore retained within the master cylinder and are properly indexed in position when the master cylinder is inactive.

What is claimed is:
1. In a master cylinder assembly having a housing with a bore open at one end, a piston slidable in said bore, and a push rod extending into said bore through the bore open end and engaging said piston for movement thereof, the improvement comprising
   a push rod retainer and piston stop including:
   a socket formed in the end of said piston toward the bore open end;
   a ball end on said push rod engaging said socket in compressive force transmitting relation and being larger in diameter than the main rod portion of said push rod;
   said bore having an annular groove formed in the wall thereof adjacent the bore open end, said groove having chamfered side walls and a bottom wall;
   said housing having a notch therein positioned radially outward of said groove and extending through a chordal arc with the chord thereof being at least as long as the diameter of the bottom wall of said annular groove, and substantially parallel chordal bores extending through said housing in a plane containing said notch and said annular groove and intersecting said annular groove on opposite sides thereof and said notch adjacent the chordal ends thereof;

and a generally U-shaped wire retainer having the legs thereof inserted in said chordal bores and the portion joining the retainer legs received in said notch wherein portions of the retainer legs are within said annular groove and are engageable with said push rod ball end on the other side thereof from said piston to prevent said piston and said push rod from exiting through the bore open end and to provide a stop for said piston and said push rod ball end when the master cylinder assembly is inactive to define the retracted position of said piston.

2. A retainer assembly for a headed member reciprocably received in a bore, said assembly comprising:

a housing having a bore therein, an inner peripheral groove in said bore with chamfered side walls, an outer peripheral notch in a plane also containing said groove, and a pair of substantially parallel through-bores extending in the plane from said notch and intersecting said groove and said bore on opposite sides thereof, and a spring retainer having a center section joining a pair of substantially parallel legs resiliently urged apart and having out-turned ends, said center section being in said notch and said legs extending through said through-bores and chordally intersecting said housing bore for retaining engagement by the headed member in the housing bore, said out-turned ends and the resiliency of said legs cooperating with the ends of the through-bores to releasably lock said retainer against removal.

* * * * *